United States Patent
Han et al.

(10) Patent No.: US 10,691,763 B2
(45) Date of Patent: Jun. 23, 2020

(54) TRUSTABLE WEB SEARCHING VERIFICATION IN A BLOCKCHAIN

(71) Applicant: International Business Machines Corporation, Armonk, NY (US)

(72) Inventors: Su Han, Pudong New District (CN); Feifei Li, Zhejiang Province (CN); Qi Liang, Shanghai (CN); Chang X. Miao, Shanghai (CN); Liu Xin, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 245 days.

(21) Appl. No.: 15/349,299

(22) Filed: Nov. 11, 2016

(65) Prior Publication Data
US 2018/0137196 A1    May 17, 2018

(51) Int. Cl.
*G06F 16/9535*    (2019.01)

(52) U.S. Cl.
CPC ................ *G06F 16/9535* (2019.01)

(58) Field of Classification Search
CPC ........... G06F 17/30867; G06F 16/9535
See application file for complete search history.

(56) References Cited

U.S. PATENT DOCUMENTS

| | | | |
|---|---|---|---|
| 6,738,678 B1 * | 5/2004 | Bharat | G06F 17/30864 358/403 |
| 8,069,167 B2 | 11/2011 | Gao et al. | |
| 8,079,087 B1 | 12/2011 | Spies et al. | |
| 8,601,017 B2 | 12/2013 | Deshmukh | |
| 8,886,570 B1 * | 11/2014 | Amancherla | G06Q 20/3676 235/379 |
| 9,152,716 B1 | 10/2015 | Triandopoulos et al. | |
| 9,256,676 B2 | 2/2016 | Frumkin et al. | |
| 2003/0204501 A1 | 10/2003 | Moon | |
| 2010/0114862 A1 * | 5/2010 | Young | G06F 17/30864 707/709 |
| 2015/0379510 A1 * | 12/2015 | Smith | G06Q 20/3829 705/71 |
| 2016/0321278 A1 * | 11/2016 | Naqvi | G06Q 10/1093 |
| 2017/0243214 A1 * | 8/2017 | Johnsrud | G06Q 20/401 |
| 2017/0243217 A1 * | 8/2017 | Johnsrud | G06Q 20/4014 |
| 2017/0244721 A1 * | 8/2017 | Kurian | H04L 63/105 |
| 2018/0025012 A1 * | 1/2018 | Cao | G06F 17/3089 707/740 |
| 2018/0025181 A1 * | 1/2018 | Barinov | G06F 21/645 726/26 |

OTHER PUBLICATIONS

The Blockchain is the new Google, published on May 11, 2016 https://techcrunch.com/2016/05/11/the-blockchain-is-the-new-google/ (Year: 2016).*

* cited by examiner

*Primary Examiner* — Tarek Chbouki
*Assistant Examiner* — Maher N Algibhah

(57) ABSTRACT

Providing web search results which are verifiable via the blockchain may offer transparency into valid web pages and their availability when conducting a search. One example method of operation may include performing a plurality of web page interactions by a plurality of network node devices operating on a network, validating existence of valid web pages, detecting invalid web pages based on the plurality of web page interactions, and storing a valid page package with the valid web pages in a blockchain.

20 Claims, 10 Drawing Sheets

500

750

TRUSTABLE WEB SEARCHING VERIFICATION IN A BLOCKCHAIN

TECHNICAL FIELD

This application relates to web searching optimization and more specifically to storing verified web search results in a blockchain.

BACKGROUND

A web search engine is a software system designed to search for information on the Internet. Search results are generally presented in an order of importance. With the rapid development of the Internet, users rely heavily on search engines to receive information. Most of the known search engines are owned by commercial companies whose ranking algorithms are confidential from the public and are potentially skewed since they may return results based on their commercial interests which may mislead users to select less than optimal web pages.

SUMMARY

One example embodiment may include a method that comprises one or more of performing a plurality of web page interactions by a plurality of network node devices operating on a network, validating existence of valid web pages, detecting invalid web pages based on the plurality of web page interactions, and storing a valid page package with the valid web pages in a blockchain.

Another example embodiment may include an apparatus that includes a processor configured to perform a plurality of web page interactions by a plurality of network node devices operating on a network, validate existence of valid web pages, detect invalid web pages based on the plurality of web page interactions, and a memory configured to store a valid page package with the valid web pages in a blockchain.

Another example embodiment may include a non-transitory computer readable storage medium configured to store instructions that when executed causes a processor to perform performing a plurality of web page interactions by a plurality of network node devices operating on a network, validating existence of valid web pages, detecting invalid web pages based on the plurality of web page interactions, and storing a valid page package with the valid web pages in a blockchain.

DETAILED DESCRIPTION

Figure 1:
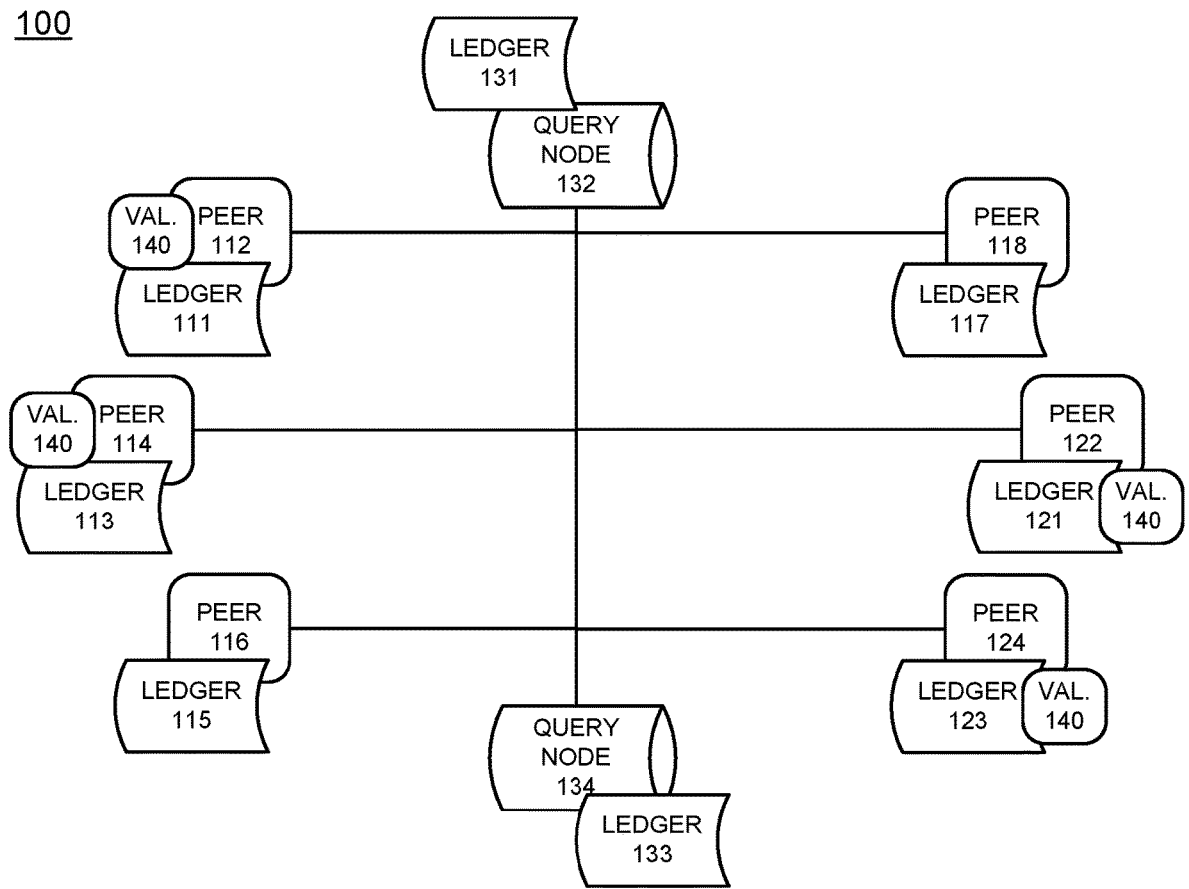
FIG. 1 illustrates a peer-to-peer network of nodes receiving validated web search results according to example embodiments.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure, method, apparatus, system, and non-transitory computer readable medium which support a trustable searching verification system based on a blockchain to provide various measures of pages returned by a search engine. Search results are verified according to page importance and in a secure and accessible manner.

A large variety of web crawlers (commercial or noncommercial) may be implemented to 'crawl' the Internet and submit web page information to the system. In one example of operation, upon receiving a web page package, validating nodes on the network will perform one or more of the following: receive the package and examine the information to validate the page relationship, check the page existence, check page cheating information, convert a reference format, store verified page as valid pages in the package, discard all invalid page package information, such as sites which are identified as non-relevant, spam, etc. Checking page existence to guarantee the results are reliable is performed and then checking for cheating using algorithms to filter-out spamming or self-promotion type sites can be performed. The page package may be converted from one form to another (such as from referrer to referees) and stored in the blockchain in a form as {url: [referrerA, referrerB, . . . ]}. Next, a node may be queried periodically to perform one or more of: merge page relationships, calculate page values, save the data in a database (DB) and cache the results in a local memory cache for faster subsequent query operations. In another example, a user may use a web browser plugin to access and query the information in the system server, for example, for a page importance level of the search result returned by a search engine to verify the rank is not manipulated.

FIG. 1 illustrates a peer-to-peer (P2P) network of nodes operating on a network and receiving validated web search results according to example embodiments. Referring to FIG. 1, the network 100 includes a plurality of peer nodes used to validate a current web package of identified sites. Among the various peers 112, 114, 116, 118, 122 and 124, each has its own ledger 111, 113, 115, 117, 121 and 123, respectively. As may be observed, the validations are being performed by some of the nodes as a validated indicator 140 is associated with those nodes. The query nodes 132 and 134 provide a communication link to user's seeking access to one or more of the updated ledgers 131 and 133 to identify the valid sites.

In operation, an end-user, via an end-user device (not shown) may input a URL or domain to a 'checker' website and then receive a page rank and other rank values. The end-users may query the page value of the searching result returned by a search engine, so that they can verify the ranking. The page value is a relative numeric value demonstrating the rank of the pages relevant to what end-users submit for a search. Usually, the pages most relevant to an end-user's input or which are referred to most by other web sites are considered high-value pages in one embodiment. The end-users can check page values of the search results to see whether their ranking are reasonable, and whether low-value pages are present along with high-value pages. This application helps end-users find abnormal rankings in search results and avoid being misled by misstated information.

This application and related context is operated on a blockchain and is not owned or controlled by any single entity. By the very nature of blockchain, the page values on this system cannot be falsified. No single entity can fully impact the results. The system is open to a device to contribute information from their web crawler, provide information to host nodes in the system, and use the information from the system for query verification. The data on this system is from various providers and validated by nodes owned by different entities so the end-users can trust the information. In general, web crawling is the technology used by search engines to update web content for searching or indexing. One aspect is the relationship of web pages to sites, as follows: Page A→Page B→Page F→Page C→Page G→Page D→Page E→Page H.

A web page ranking can be determined by a search engine using information stored in a searching and/or indexing database to find pages most relevant to key words and/or other information being received. The number of results may be large but end-users typically access a small part of that information. As such, search engines typically calculate page values using certain algorithms so that high-value pages are positioned first. Some algorithms assume that important web pages or sites are likely to be referred by other web pages and sites. The more the pages are referred by others, the higher the resulting value. The instant system utilizes a blockchain network which includes various types of nodes communicably coupled to one another. These nodes define the roles in the system so they reside in the same physical machine. A ledger node or peer node stores and maintains web page relationship information which is referred to as a ledger in blockchain terminology. Each node stores one copy of the complete ledger which includes a number of blocks in the blockchain.

Figure 2:
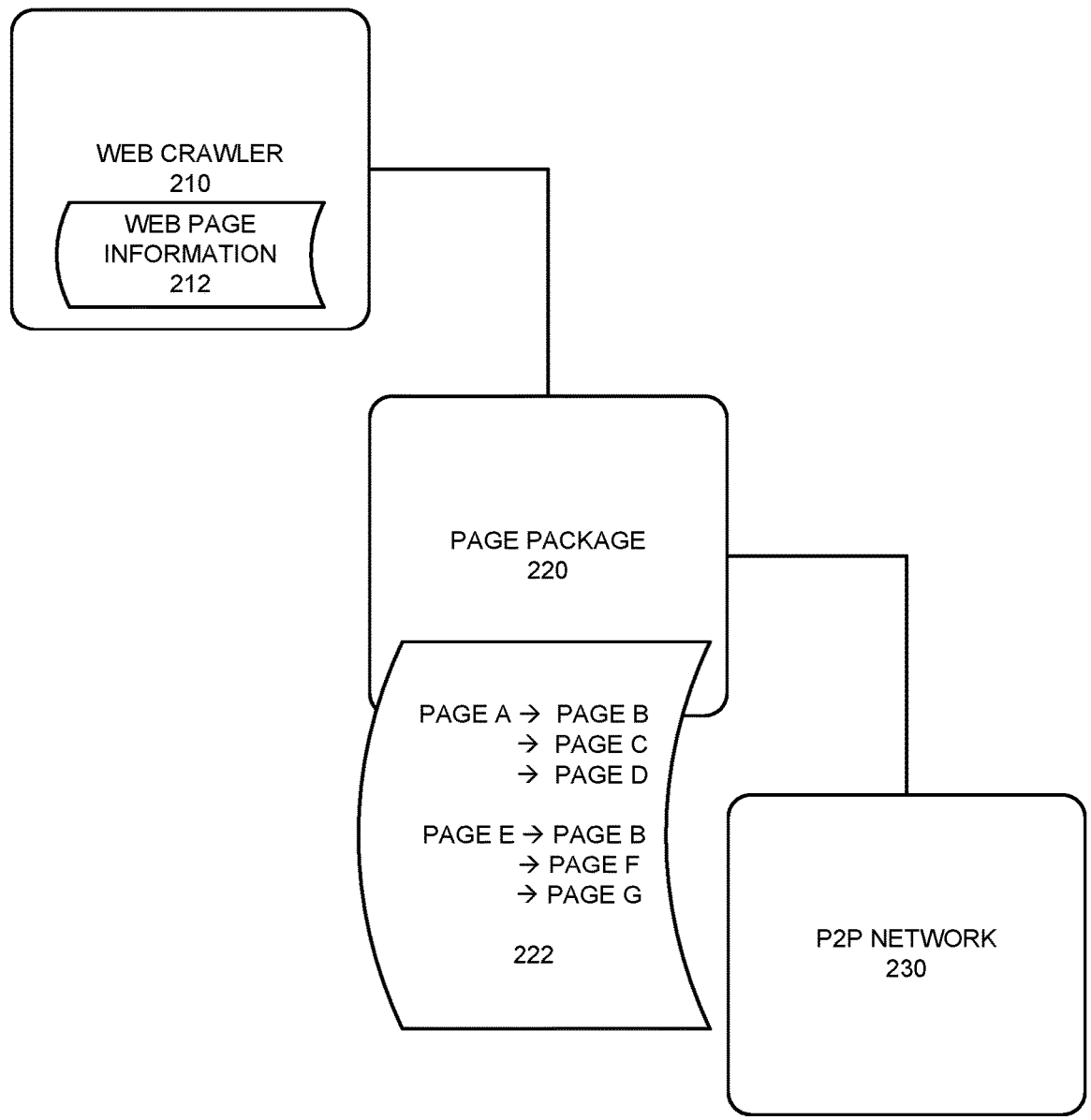
FIG. 2 illustrates a logic diagram of constructing a web page package for sharing with the network nodes according to example embodiments.

FIG. 2 illustrates a logic diagram of constructing a web page package that can be shared with the network nodes according to example embodiments. Referring to FIG. 2, the example 200 includes a web crawler 210 providing web page information 212 to a page package 220 which tabulates the information and packages it to send to the network devices in the network 230. The information may include various pages and references which would yield a particular ranking or rating 222. In this example, both A and E refer B. A and E are referrers, while B is a referee: E→B, E→F, E→G. A validation node in, or communicably coupled to, the network may validate the page package received from the web crawler(s). The page package is associated with a ledger node serving as a worker node to validate whether the page package is valid to store in the ledger prior to storing information. However, a ledger node can also validate the page package as well. A query node provides an interface for end-users to query for web page values. This node converts the complete ledger to a form suitable for a quick query. Any of those nodes may be part of the P2P network 100. When a web crawler sends web page information to a ledger node, the web page information is sent in a predefined format to the ledger node. This format is defined by the ledger node and called a page package. One page package contains a list of web page information. For each web page, the information includes one or more of the page's URL, key words (which can be discovered by analyzing the page contents) and all links included in the page as well. The ledger node receiving this package broadcasts it to all peer ledger nodes and asks for validation.

Figure 3:
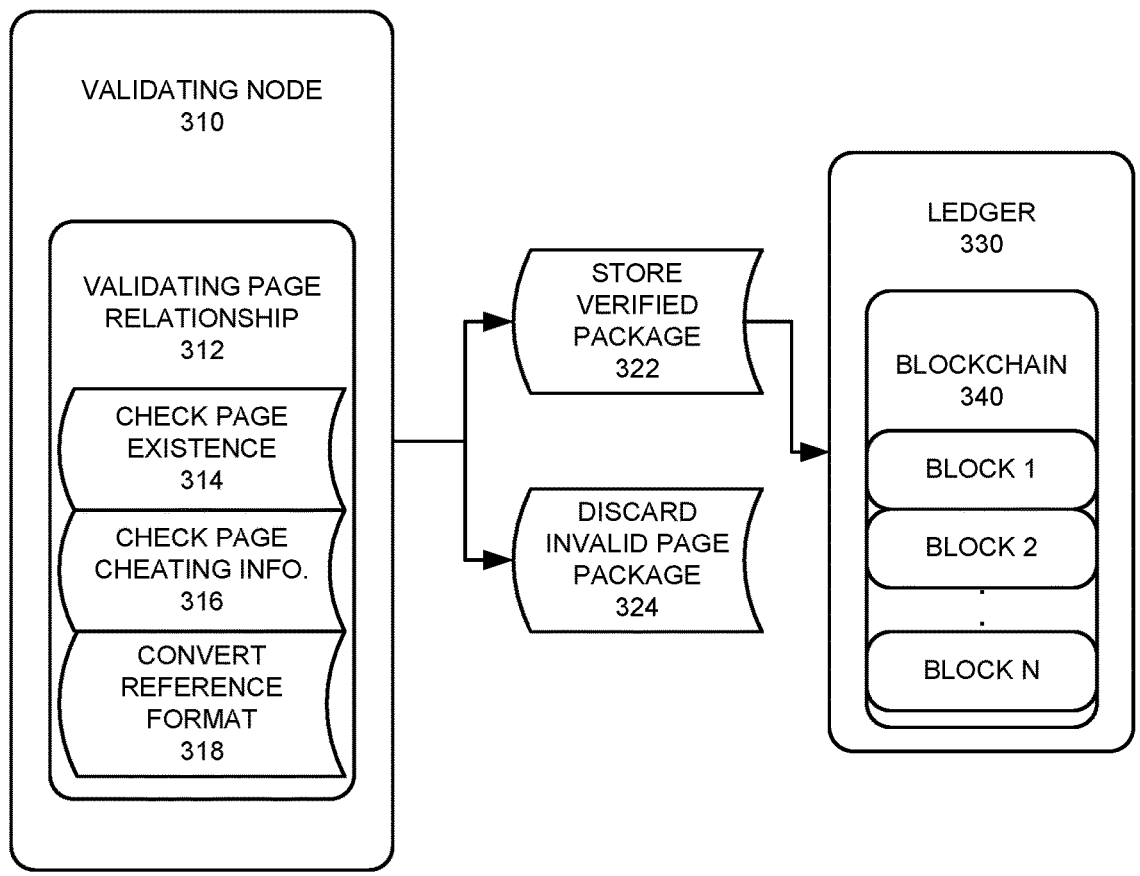
FIG. 3 illustrates a logic diagram of a validating node validating results of a web page package and storing the results in a blockchain according to example embodiments.

FIG. 3 illustrates a logic diagram of a validating node validating the results of a web page package and storing the results in a blockchain according to example embodiments. Referring to FIG. 3, the validation procedure 300 includes a validating node 310 which verifies packages received and determines whether to store the data in the ledger 330. Validating the page relationship provides that when a ledger node receives a page package, it dispatches it to its validation node. The validation node might also receive a page package from a web crawler. The page packages are stored in a queue. The validation process 312 takes one package from the queue and validates it. For example, the validation can include checking whether web pages in a page package exists or not 314, by retrieving them (via, for example, a HTTP GET request). If many pages don't exist and the number or percentage of missing pages is above a threshold (i.e., 5%, 10%, 20%, etc.) this package is marked as invalid and discarded. The process can also check whether the links in the page exist or not. The bad links are ignored. The process can also check whether the package is a cheating package or contains cheating information 316. Some web sites cheat for better page values. Examples of fake information may include a large number of referring pages to increase a page's value. There are many approaches to detecting a cheating page and once it is identified, that page is marked as spam or invalid 324, for example, by ignoring or lowering the referring pages from the same data center or with a same IP prefix. The process can also convert the page package 318 from referer_to_referees to know how many pages refer one page as shown in FIG. 2, page A→page B, page A→page C, page A→page D. This may be converted to page L→page K, page M→page N→, etc. The result page package is called a 'searchable page package' 322 as each page contains one or more of the following information: Universal Unique Identifier (UUID): assigned to the page as an entity, URL: page's URL, referrers: list of referring pages' UUID, key words: list of key words of this page, timestamp: when it was submitted by a web crawler, and who: what web crawler submitted it and its version. This page relationship may be saved into the blockchain 340. If the page package is validated successfully 322, the ledger node votes to put it into the ledger, otherwise, the page package will be discarded 324. When multiple ledger nodes vote to put such information into the ledger, and a consensus is reached according to the consensus algorithm of the underlying blockchain network (i.e., majority of nodes, etc.), this package is accepted and saved in the ledger as a valid package.

The ledger node saves multiple validated page packages into one block in a blockchain. It can be a fixed number of validated page packages, such as 100 packages per block, or a predefined time period such as 1 to 5 minutes per block. The blockchain contains a great number of blocks, and each block contains many validated page packages as indicated above. One web page is very likely to appear in multiple blocks, and its referrer list might duplicate crossing these blocks. Furthermore, it is not efficient to query page values from a blockchain. As such, a query node is introduced to take a snapshot of the ledger, merge page referrers, and calculate page values with a ranking algorithm. The query node saves page values in a database for a quick query return since it can take a long time to calculate page values and generate the database.

Figure 4A:
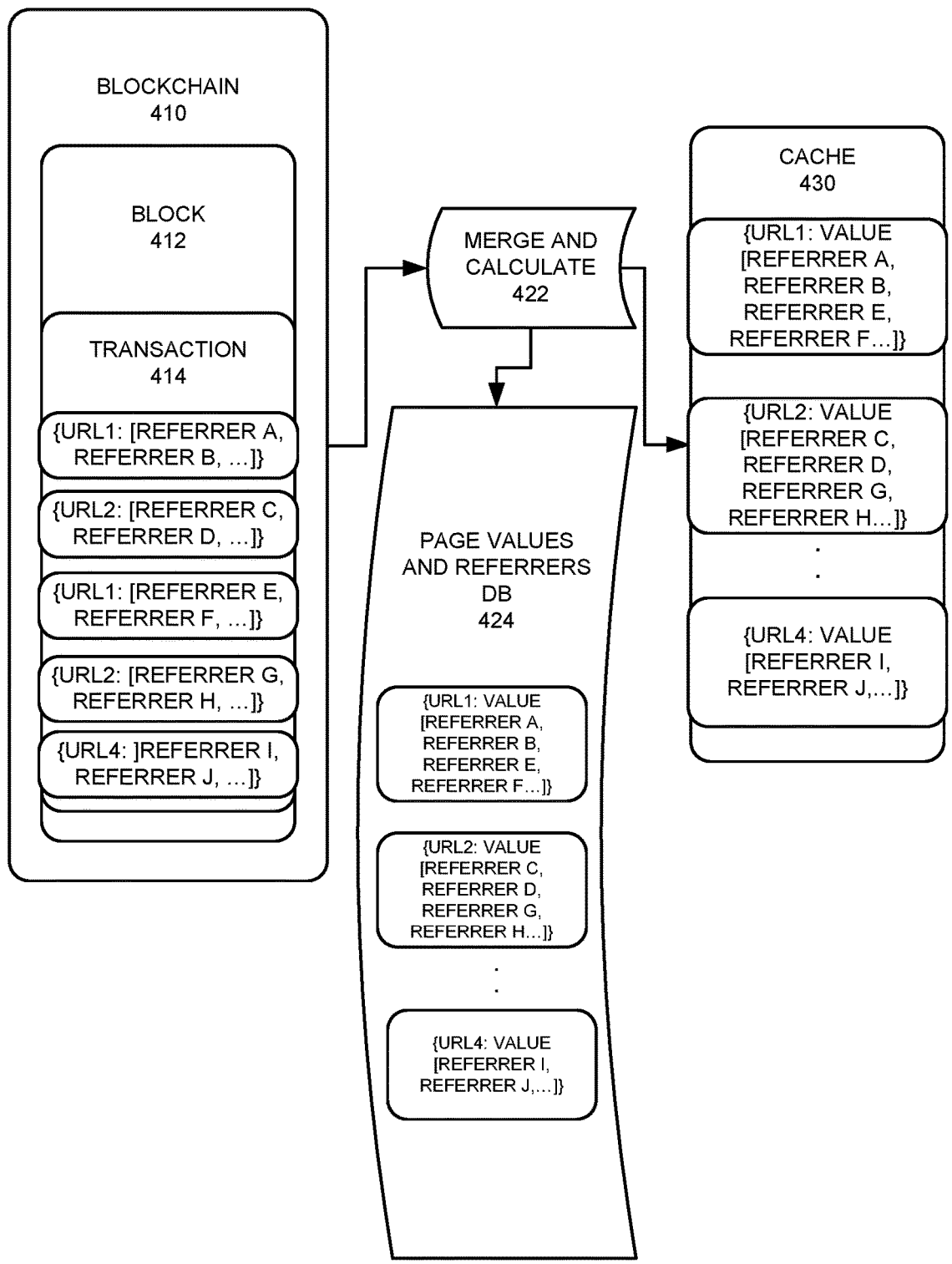
FIG. 4A illustrates a logic diagram of a cache being updated with merged page relationships according to example embodiments.

FIG. 4A illustrates a logic diagram of a cache being updated with merged page relationships according to example embodiments. Referring to FIG. 4A, the example 400 includes a blockchain 410 having a block 412 of transactions 414 which are considered written and valid web pages which can then be merged and calculated 422 to update the cache 430 for easy and reliable reference purposes during a query operation. The page values are stored in a database 424 and are selected for merging and updating into a consolidated format for demonstrating the various referrers who have validated the web page information.

Figure 4B:
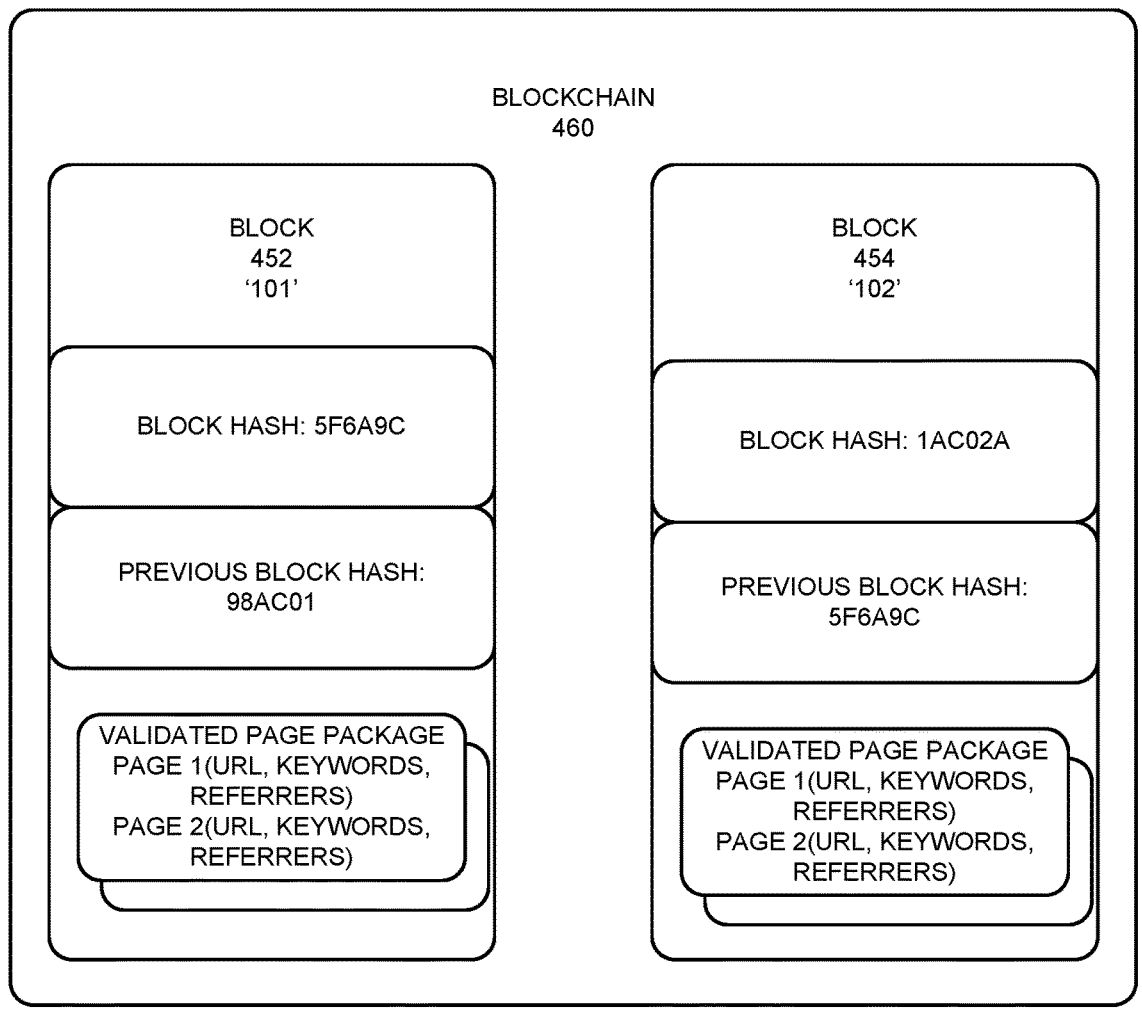
FIG. 4B illustrates a logic diagram of blocks being written with validated page information according to example embodiments.

FIG. 4B illustrates a logic diagram of blocks being written with validated page information according to example embodiments. Referring to FIG. 4B, the example 450 includes a blockchain 460 having two separate blocks for example purposes. The blocks 101 (452) and 102 (454) are completed blocks with a block hash, a reference to a previous block hash and various validated web pages and web page package information. The next block in the sequence 102 includes a reference to the previous block hash. The core information included in the blocks is related to validate page information which is organized in a manner consistent with the referrers and values associated with the page rank or other ranking value users may desire to reference when checking the page information of various web sites.

Figure 5:
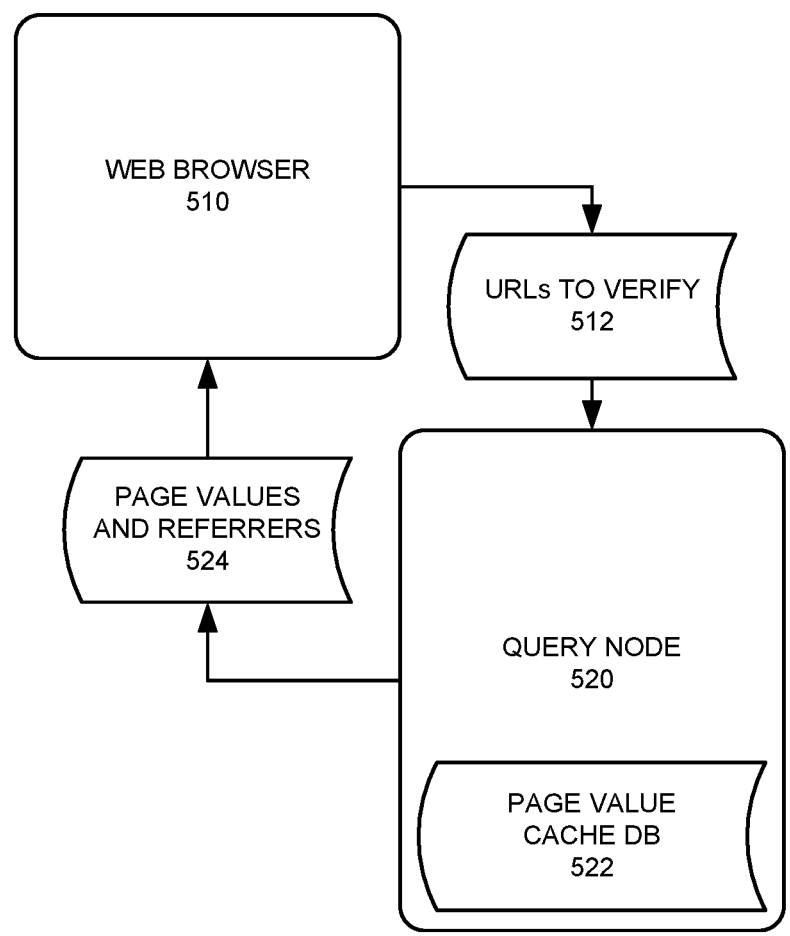
FIG. 5 illustrates a logic diagram of a browser utilizing page relevancy information according to example embodiments.

FIG. 5 illustrates a logic diagram of a browser utilizing the page relevancy information according to example embodiments. Referring to FIG. 5, this example 500 includes a user web browser 510 linking to resource modules or devices used to access the web page information and verify user submitted URLs 512 via a query node 520. The information used to provide the user with feedback may include a page value DB 522. The information needed can be quickly referenced and provided to the user's browser 510. The information may include page values, referrers, etc., 524 and other information stored in the blockchain web page packet.

The application/system can refresh a query node periodically, such as hourly, daily, weekly or biweekly in order to ensure the most updated information is available. Although, a query node does not provide a real-time page value, its information is still important considering many web pages on the Internet don't change dramatically from day-to-day. The page value may be calculated based on the information in the validated page package including a page's referrer list and certain key words. A simple way to determine one page's value is to see how many pages are referring to that page. For example, if five pages refer to page 'A', then the page A's value can be '5'. Another approach is to increase the weight of the page from different IP addresses. For example, three referring pages may have a same IP address with page 'A', and a value of '2' can be used to reference page A thereby ignoring in-site referring. There are various approaches to determine the page's value with a hyperlink, or keyword, or both, for example, PageRank, TrustRank, HITS, HillTop, are just a few tools available and no one approach is limiting to the examples.

Regarding user approaches to verification, a user may submit and receive a search result from a search engine. If he/she doubts the result, he/she can use the browser plugin or tool to submit a list of URLs in the search results to a query node in system that can reference the blockchain. Then the query node can return these URL page values which are shown next to the corresponding URL on the search result page. By comparing the page value and the ranking from search results returned by the search engine, users can easily make their own judgements whether the ranking is valid or invalid based on the blockchain data. The users may also receive the URLs that refer to the search result pages to know what web sites exactly refer to those results. For example, when a user searches through the Internet with the keyword "XYZ" and receives a search result, a number in a box may appear next to the search results and each result may have a number in a box which is the page value returned from the system application. The 1st, 2nd and 4th results may have a high value, which indicates they are most valuable to the user since they have been referred most by other sources. However, in one example, the 3rd result may have an abnormally low page value (a number that is off by a magnitude of a 1000, or more) however, the site is highly ranked on the list of sites returned. The end-users can make judgement whether they accept the 3rd result or not, in general, this result would be readily ignored.

Another example embodiment may include a variety of web crawlers (commercial or non-commercial) exploring Internet pages and submitting web page information to the system/application. Upon receiving a page package, the validating nodes will synchronize the package across the network and perform verification including validating page existence and detecting spamming, then storing the valid package into the blockchain. The query nodes can periodically merge page relationships for convenience and calculate page values and save the information to a DB and also cache the results for faster querying in subsequent query operations. The end users can use a web browser plugin to query the system for the page importance of the search result returned by a search engine to verify the rank is not manipulated.

Figure 6:
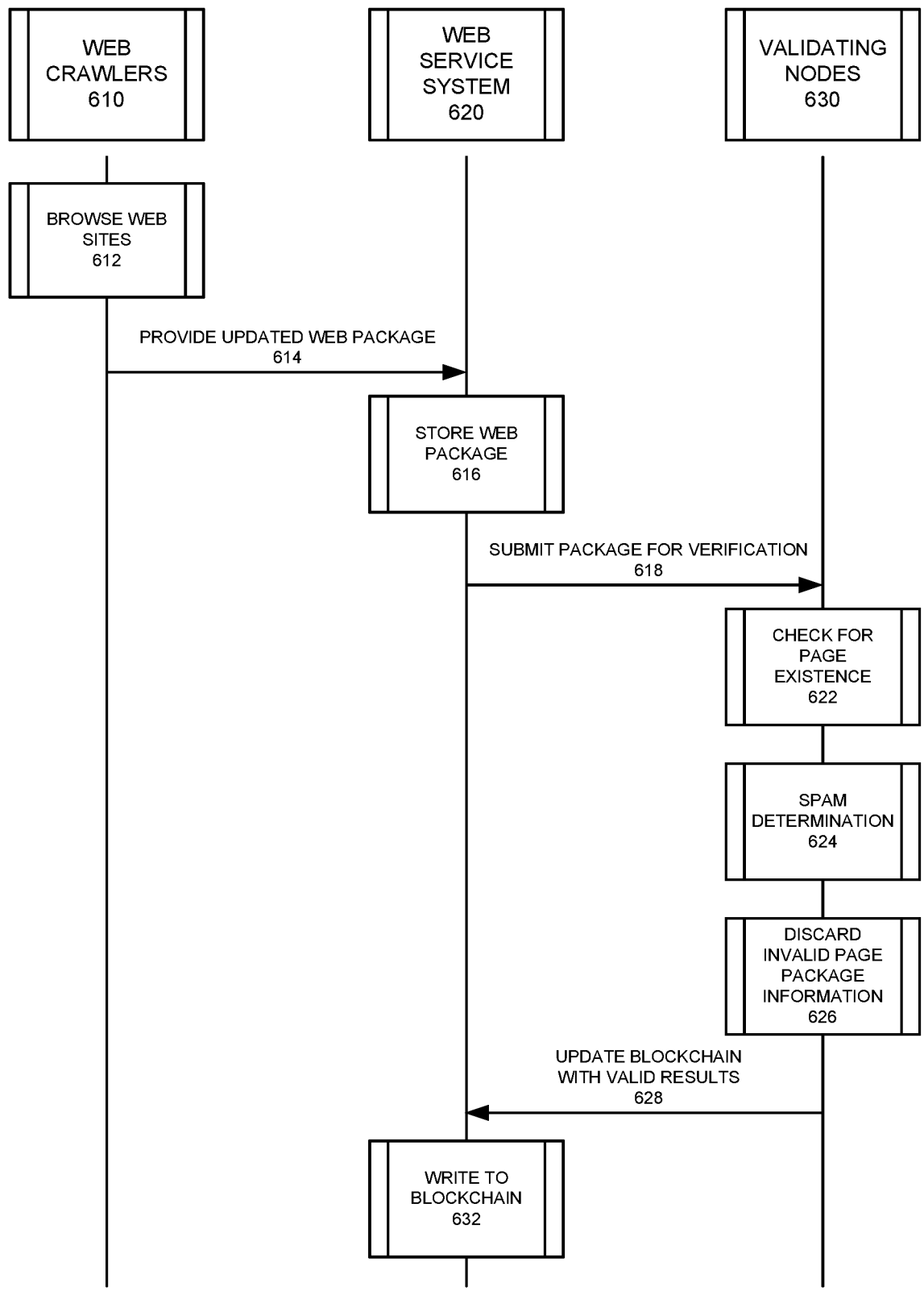
FIG. 6 illustrates a system diagram of a communication session according to example embodiments.

FIG. 6 illustrates a system diagram 600 of a communication session according to example embodiments. Referring to FIG. 6, the system includes web crawlers 610 as modules, entities, remote services, etc., which offer information by browsing the web. The crawlers 610 also access sites 612 and log information about sites including page links and other metrics and provide that information to the web service system 620 as a package 614. The information is stored 616 and then forwarded to any number of validating nodes 630. The package is received 618 at each validating node and the multi-operation process is then performed to check for page existence 622, perform a spam/invalid page determination 624 and discard or update the package with those results which are deemed approved 626. The updated results are then sent back 628 and the blockchain is updated 632 with the correct and approved web site information.

Figure 7A:
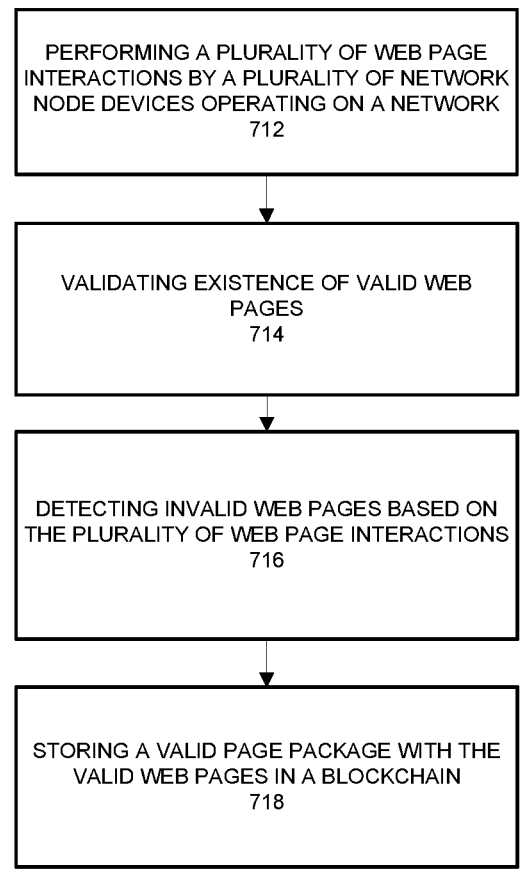
FIG. 7A illustrates an example method of operation according to example embodiments.

FIG. 7A illustrates an example method of operation according to example embodiments. Referring to FIG. 7A, the method 700 comprises one or more of performing a plurality of web page interactions by a plurality of network node devices operating on a network 712, validating existence of valid web pages 714, detecting invalid web pages based on the plurality of web page interactions 716, and storing a valid page package with the valid web pages in a blockchain 718.

Figure 7B:
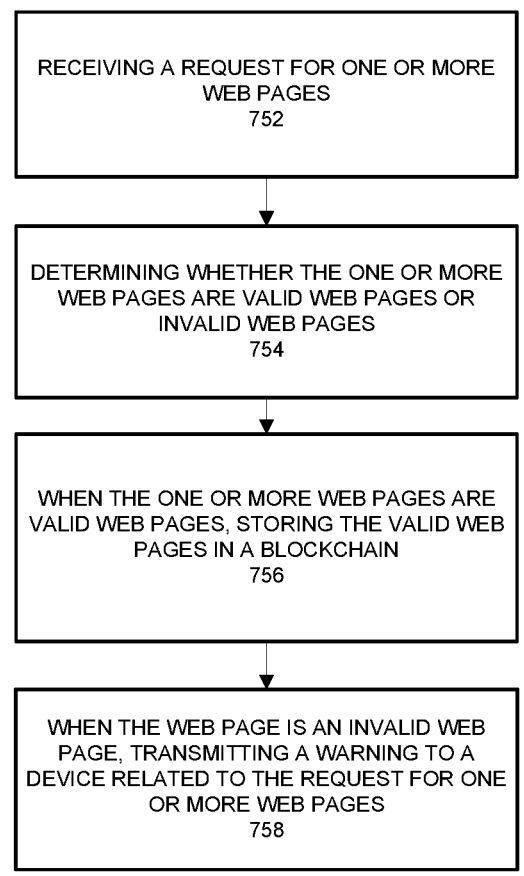
FIG. 7B illustrates another example method of operation according to example embodiments.

FIG. 7B illustrates another example method of operation according to example embodiments. Referring to FIG. 7B, the method 750 comprises one or more of receiving a request for one or more web pages 752, determining whether the one or more web pages are valid web pages or invalid web pages 754, in the event that one or more of those pages are valid, then the valid ones are stored in the blockchain 756. However, if any of the pages are identified as invalid or spam or not reliable sources of information then those pages may trigger a warning alert be generated and sent to at least one registered interested party 758. The validator entity that is in the process of validating the results may be the party receiving the alert message when the results are deemed invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example network element 800, which may represent or be integrated in any of the above-described components, etc.

Figure 8:
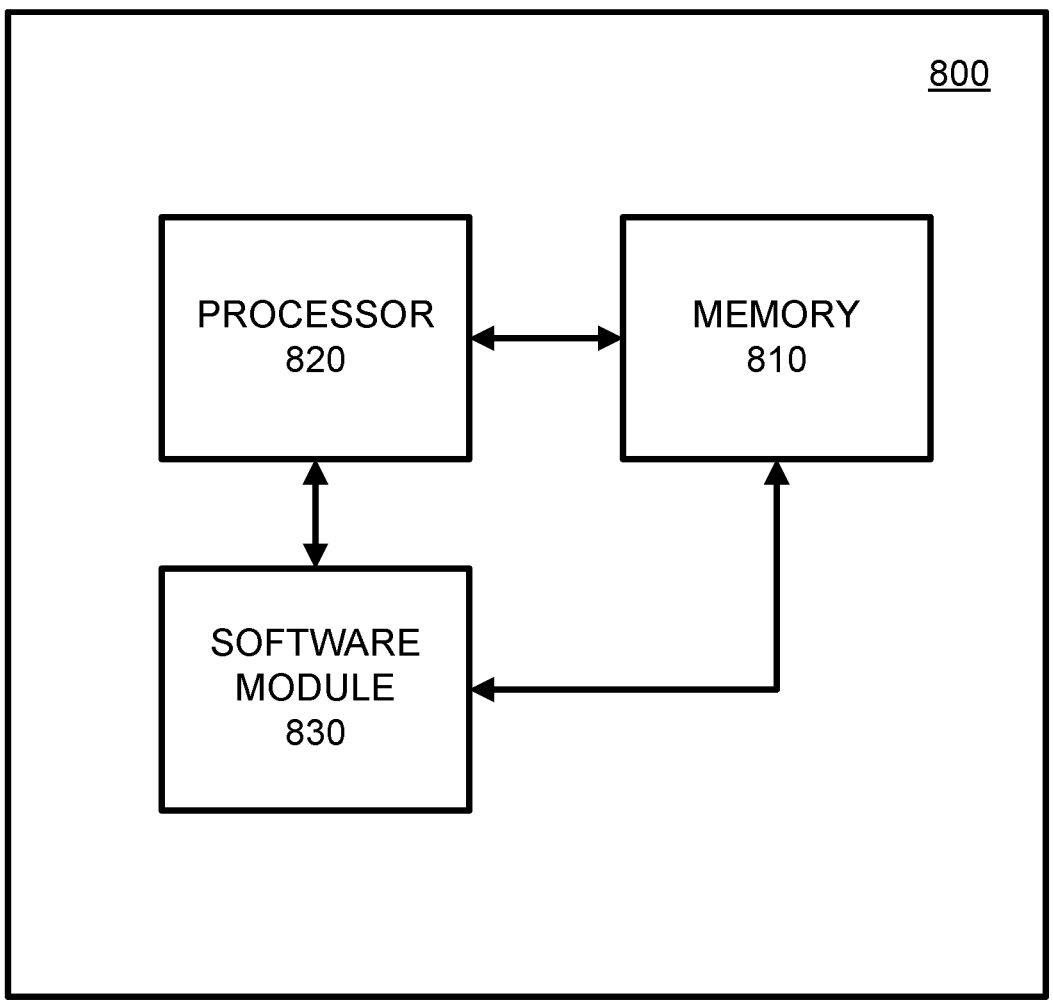
FIG. 8 illustrates an example network entity configured to support one or more of the example embodiments.

As illustrated in FIG. 8, a memory 810 and a processor 820 may be discrete components of a network entity 800 that are used to execute an application or set of operations as described herein. The application may be coded in software in a computer language understood by the processor 820, and stored in a computer readable medium, such as, a memory 810. The computer readable medium may be a non-transitory computer readable medium that includes tangible hardware components, such as memory, that can store software. Furthermore, a software module 830 may be another discrete entity that is part of the network entity 800, and which contains software instructions that may be executed by the processor 820 to effectuate one or more of the functions described herein. In addition to the above noted components of the network entity 800, the network entity 800 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
performing a plurality of web page interactions by a plurality of network node devices operating on a network, wherein the plurality of network node devices include peer nodes each having a blockchain ledger to store and maintain information identifying web page referral relationships, and wherein the plurality of network node devices further include at least one query node providing access, by a user, to the peer nodes;
validating web pages based on a consensus reached by peer nodes using information contained in the blockchain ledger;
storing a valid web page package with the valid web pages in the blockchain ledger of the peer nodes;
calculating a page value for each of the valid web pages based on a number of web pages that refer to each of the valid web pages;
consolidating, via the at least one query node, information regarding the valid page package contained in the blockchain ledger by merging the identified web page referral relationships and the calculated page values into a single database of the query node; and
saving the consolidated information to the single database of the query node wherein the single database is not part of the blockchain ledger, and wherein the single database is different than the blockchain ledger.

2. The method of claim 1, further comprising:
receiving a web page package comprising web page information of a plurality of web pages.

3. The method of claim 1, further comprising:
receiving a contributed web page;
validating the contributed web page; and
storing the contributed web page in a web page package responsive to validating the contributed web page.

4. The method of claim 1, further comprising:
determining page importance values for one or more of the valid web pages by the plurality of network node devices;
comparing the page importance values calculated by the plurality of network node devices; and
storing the page importance values in the single database.

5. The method of claim 4, wherein the storing the page importance values further comprises storing the page importance values that are within a threshold range of one another based on the comparing of the page importance values.

6. The method of claim 4, further comprising:
discarding the page importance values which are outside a threshold range of a majority of the page importance values.

7. The method of claim 4, wherein each of the page importance values are determined by a different one of the plurality of network node devices.

8. An apparatus, comprising:
at least one processor configured; and
a memory storing at least one instruction that when executed by the at least one processor causes the at least one processor to:
perform a plurality of web page interactions by a plurality of network node devices operating on a network, wherein the plurality of network node devices include peer nodes each having a blockchain ledger to store and maintain information identifying web page referral relationships, and wherein the plurality of network node devices further include at least one query node providing access, by a user, to the peer nodes,
validate existence of valid web pages based on a consensus reached by peer nodes using information contained in the blockchain ledger,
store a valid web page package with the valid web pages in the blockchain ledger of the peer nodes,
calculate a page value for each of the valid web pages based on a number of web pages that refer to each of the valid web pages,
consolidate information regarding the valid page package contained in the blockchain ledger by merging the identified web page referral relationships and the calculated page values into a single database of the query node, and
save the consolidated information to the single database of the query node wherein the single database is not part of the blockchain ledger, and wherein the single database is different than the blockchain ledger.

9. The apparatus of claim 8, wherein the memory further stores at least one instruction that when executed by the at least one processor causes the at least one processor to:
receive a web page package comprising web page information of a plurality of web pages.

10. The apparatus of claim 8, wherein the memory further stores at least one instruction that when executed by the at least one processor causes the at least one processor to:
receive a contributed web page,
validate the contributed web page, and store the contributed web page in a web page package responsive to the contributed web page being validated.

11. The apparatus of claim 8, wherein the memory further stores at least one instruction that when executed by the at least one processor causes the at least one processor to:
   determine page importance values for one or more of the valid web pages by the plurality of network node devices;
   compare the page importance values calculated by the plurality of network node devices, and
   store the page importance values in the single database.

12. The apparatus of claim 11, wherein the stored page importance values are within a threshold range of one another based on the comparison of the page importance values.

13. The apparatus of claim 11, wherein the memory further stores at least one instruction that when executed by the at least one processor causes the at least one processor is further configured to:
   discard the page importance values which are outside a threshold range of a majority of the page importance values.

14. The apparatus of claim 11, wherein each of the page importance values are determined by a different one of the plurality of network node devices.

15. A non-transitory computer readable storage medium configured to store at least one instruction that when executed by a processor causes the processor to:
   perform a plurality of web page interactions by a plurality of network node devices operating on a network wherein plurality of network node devices include peer nodes each having a blockchain ledger to store and maintain information identifying web page referral relationships, and wherein the plurality of network node devices further include at least one query node providing access, by a user, to the peer nodes;
   validate existence of valid web pages based on a consensus reached by peer nodes using information contained in the blockchain ledger;
   store a valid page package with the valid web pages the blockchain ledger of the peer nodes;
   calculate a page value for each of the valid web pages based on a number of web pages that refer to each of the valid web pages;
   consolidate information regarding the valid page package contained in the blockchain ledger by merging the identified web page referral relationships and the calculated page values into a single database of the query node, and
   save the consolidated information to the single database of the query node wherein the single database is not part of the blockchain ledger, and wherein the single database is different than the blockchain ledger.

16. The non-transitory computer readable storage medium of claim 15, wherein the non-transitory computer readable storage medium is further configured to store at least one instruction to cause the processor to:
   receive a web page package comprising web page information of a plurality of web pages.

17. The non-transitory computer readable storage medium of claim 15, wherein the non-transitory computer readable storage medium is further configured to store at least one instruction to cause the processor to:
   receive a contributed web page;
   validate the contributed web page; and
   store the contributed web page in a web page package responsive to validating the contributed web page.

18. The non-transitory computer readable storage medium of claim 15, wherein the non-transitory computer readable storage medium is further configured to store at least one instruction to cause the processor to:
   determine page importance values for one or more of the valid web pages by the plurality of network node devices;
   compare the page importance values calculated by the plurality of network node devices; and
   store the page importance values in the single database.

19. The non-transitory computer readable storage medium of claim 18, wherein, when the processor is to store the page importance values, the processor further is to:
   store page importance values that are within a threshold range of one another based on the comparing of the page importance values.

20. The non-transitory computer readable storage medium of claim 18, wherein the non-transitory computer readable storage medium is further configured to store at least one instruction to cause the processor to:
   discarding page importance values that are outside a threshold range of a majority of the page importance values, and wherein each of the page importance values are determined by a different one of the plurality of network node devices.

* * * * *

UNITED STATES PATENT AND TRADEMARK OFFICE
CERTIFICATE OF CORRECTION

PATENT NO. : 10,691,763 B2  
APPLICATION NO. : 15/349299  
DATED : June 23, 2020  
INVENTOR(S) : Han Su et al.

Page 1 of 1

It is certified that error appears in the above-identified patent and that said Letters Patent is hereby corrected as shown below:

On the Title Page

Item (72) Inventor Su Han should be corrected to Han Su and Inventor Liu Xin should be Xin Liu.

Signed and Sealed this
Twenty-ninth Day of December, 2020

Andrei Iancu
*Director of the United States Patent and Trademark Office*